United States Patent
Dine et al.

(10) Patent No.: US 7,040,992 B2
(45) Date of Patent: May 9, 2006

(54) BOLTLESS RETENTION SYSTEM FOR A CONSTANT VELOCITY JOINT

(75) Inventors: Donald W. Dine, Rochester Hills, MI (US); Frederick J. Uchman, Clarkston, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 26 days.

(21) Appl. No.: 10/768,802

(22) Filed: Jan. 31, 2004

(65) Prior Publication Data

US 2005/0170899 A1    Aug. 4, 2005

(51) Int. Cl.
*F16D 3/84* (2006.01)

(52) U.S. Cl. .................. 464/170; 464/145; 464/177

(58) Field of Classification Search ........ 464/144–146, 464/111, 177, 905, 906, 173, 175, 170; 403/342, 403/364, 118, 359.6
See application file for complete search history.

(56) References Cited

U.S. PATENT DOCUMENTS

| 2,007,897 | A | * | 7/1935 | Skeel ..................... 403/364 |
| 2,381,096 | A | * | 8/1945 | Abbott .................. 464/145 |
| 3,712,583 | A | * | 1/1973 | Martindale et al. |
| 4,610,643 | A | * | 9/1986 | Krude .................... 464/906 |
| 5,676,599 | A | * | 10/1997 | Ricks et al. |
| 6,158,916 | A | * | 12/2000 | Wormsbaecher ....... 464/146 X |
| 6,361,444 | B1 | * | 3/2002 | Cheney et al. |
| 6,669,570 | B1 | * | 12/2003 | Krude ................ 403/364 X |
| 2002/0163181 | A1 | * | 11/2002 | Russell |
| 2004/0072622 | A1 | * | 4/2004 | Hassenrik et al. ........ 464/145 |
| 2005/0137022 | A1 | * | 6/2005 | Neeley et al. ............. 464/111 |

\* cited by examiner

*Primary Examiner*—Greg Binda
(74) *Attorney, Agent, or Firm*—Jennifer M. Brumbaugh; Mick A. Nylander (57) ABSTRACT

A constant velocity joint for use in a prop shaft of an automotive vehicle includes an outer race. The constant velocity joint also includes an inner race arranged within the outer race and a rolling element arranged between the outer race and inner race. A cage is arranged between the outer race and inner race such that the cage positions the rolling element therebetween. The constant velocity joint also includes a flange contacting the outer race. Torque is transmitted through the use of a face spline. A collar contacts the flange and outer race and secures the flange and outer race to one another in an axial direction.

19 Claims, 5 Drawing Sheets

BOLTLESS RETENTION SYSTEM FOR A CONSTANT VELOCITY JOINT

BACKGROUND OF THE INVENTION

1. Field of the Invention

The present invention generally relates to constant velocity joints and more particularly, relates to a boltless axial retention system for use with a constant velocity joint.

2. Description of the Related Art

Constant velocity joints (CV joints) are common components in automotive vehicles. Typically, constant velocity joints are used where a transmission of constant velocity rotating motion is required. The common types of constant velocity joints are plunging tripod, a fixed tripod, a plunging ball joint and a fixed ball joint. These types of joints currently are used in front wheel drive vehicles, rear wheel drive vehicles and on propeller shafts found in rear wheel drive, all wheel drive and four wheel drive vehicles. The constant velocity joints are generally grease lubricated for life and sealed by a sealing boot when used on drive shafts. Therefore, constant velocity joints are sealed in order to retain grease inside the joint and keep contaminates, such as dirt and water out of the joint. To achieve this protection the constant velocity joint is usually enclosed at the open end of the outer race by a sealing boot made of a rubber, thermoplastic or silicone type material. The opposite end of the outer race generally is enclosed by a dome or cap, known as a grease cap in the case of a disk type joint. A monoblock or integral stem and race design style joint is sealed by the internal geometry of the outer race. This sealing and protection of the constant velocity joint is necessary because contamination of the inner chamber of the outer joint generally will cause internal damage to the joint.

A constant velocity joint's main function is the transmission of rotational movement and torque. In the prior art constant velocity joint assemblies, a variety of bolted joint designs are used to assemble the joint to a prop shaft or half shaft within an automotive vehicle. These bolted assemblies axially fix the constant velocity joint within the driveline. The torque is then transferred through the constant velocity joint to either a prop shaft, differential, a half shaft or a wheel depending on the location of the constant velocity joint in the vehicle drive line. The torque transfer typically happens through a combination of friction between the back of the joint and the flange face and shear loading through the bolts. The use of a bolted constant velocity joint system requires special assembly instructions, increased time for installation, larger packaging requirements, and special provisions to prevent bolt loosening from vibration. The bolt loosening issue is especially problematic since some of the torque is transmitted through the bolts. Additionally, the sealing system can also be comprised since the alternating loads and movement pass through the boot can and grease cover. If such bolts are not torqued down correctly it may be possible for a bolt in the prior art systems to become loose and thus lead to the loosening of the constant velocity joint and flange interface, this will lead to increased vibrations, that will cause the failure of the prop shafts. Therefore, many of these prior art constant velocity joint connection methods are very time consuming, burdensome and difficult to install correctly in the automotive manufacturing environment.

Therefore, there is a need in the art for a constant velocity joint that is boltless, easier to install, easier to balance, more compact, and easier to seal. There also is a need in the art for a constant velocity joint that will increase the service life of the joint along with the balance and efficiency of the joint during its rotational torque transfer.

SUMMARY OF THE INVENTION

One object of the present invention is to provide an improved constant velocity joint.

Another object of the present invention is to provide a constant velocity joint that does not require bolts to assemble into the vehicle drive line.

Yet a further object of the present invention is to provide a boltless method for axial retention of a constant velocity joint assembly.

Still a further object of the present invention is to provide a constant velocity joint that uses a face spline or pins to transmit torque.

It is yet a further object of the present invention to provide a constant velocity joint which uses a collar to connect the constant velocity joint to a flange, drive shaft, half shaft or other axle module.

It is yet a further object of the present invention to provide a constant velocity joint that uses a system of threads or locking lugs to secure the constant velocity joint to a flange, drive shaft or other axle module.

To achieve the foregoing objects a constant velocity joint according to the present invention is disclosed. The constant velocity joint includes an outer race and inner race arranged within the outer race. The constant velocity joint also includes a rolling element arranged between the outer race and inner race. A cage is arranged between the outer race and inner race and positions the rolling element. The constant velocity joint also includes a flange contacting the outer race and a collar contacting the flange and outer race. The constant velocity joint also includes a face spline for transmitting torque through the constant velocity joint.

One advantage of the present invention is that it provides an improved constant velocity joint.

A further advantage of the present invention is that the constant velocity joint does not require bolts to install it within a vehicle driveline assembly or system.

Still a further advantage of the present invention is that the constant velocity joint uses a face spline to transmit torque therethrough.

Still another advantage of the present invention is that the constant velocity joint uses a collar to axially fix its position on a flange, half shaft, drive shaft or axle module.

Yet a further advantage of the present invention is the use of a thread or locking lug system to secure the joint to a flange, drive shaft, half shaft or axle module.

Still a further advantage of the present invention is the ease of installation.

Still a further advantage of the present invention are the movement made by moving the sealing system out of the torque path.

Other objects, features and advantages of the present invention will become apparent from the subsequent description and appended claims, taken in conjunction with the accompanying drawings.

DESCRIPTION OF THE PREFERRED EMBODIMENT(S)

Referring to the drawings, a constant velocity joint 11 according to the present invention is shown. It should be noted that all types of CV joints, such as plunging tripods, a fixed tripod, etc., may be used with the present invention.

Figure 1:
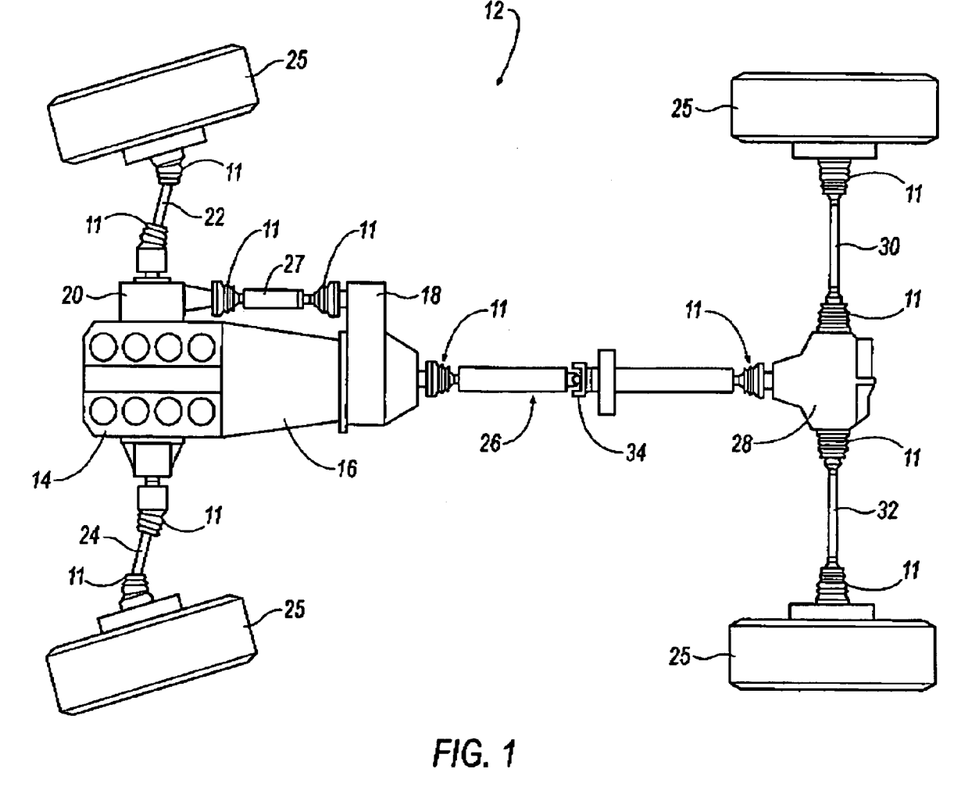
FIG. 1 shows a plan view of a vehicle driveline.

FIG. 1 Shows a typical driveline 12 of an automotive vehicle, The driveline 12 of FIG. 1 represents a typical all-wheel drive vehicle, however, it should be noted that the constant velocity joints 11 of the current invention can also be used in rear-wheel drive vehicles, front-drive vehicles, all-wheel drive vehicles, and four-wheel drive vehicles. The driveline 12 includes an engine 14 that is connected to a transmission 16 and a power takeoff unit 18. A front differential 20 has a right hand side half shaft 22 and a left hand side half shaft 24, each of which are connected to a wheel 25 and deliver power to those wheels. On both ends of the right hand front half shaft 22 and left hand front half shalt 24 are constant velocity joints. A propeller shaft 26 connects the front differential 20 to the power takeoff unit 18. A propeller shaft 26 connects the power takeoff unit 18 to the rear differential 28, wherein the rear differential 28 includes a rear right hand side shaft 30 and a rear left hand side shaft 32, each of which ends with a wheel 25 on one end thereof. A constant velocity joint is located on both ends of the half shaft that connect to the wheel 25 and the rear differential 28. The propeller shaft 26, as shown in FIG. 1, is a two-piece propeller shaft that includes Cardan joint 34 and two high speed constant velocity joints 11. The constant velocity joints 11 transmit power to the wheels 25 through the propeller shaft 26, even if the wheels 25 or the shaft have changing angles due to steering and suspension jounce and rebound. The constant velocity joints 11 may be of any of the standard types known, such as plunging tripod, cross groove joint, fixed ball joint, fixed tripod joint, or double offset joints, all of which are commonly known terms in the art for different varieties of constant velocity joints. The constant velocity joints 11 allow for transmission of constant velocities at angles which are found in everyday driving of automotive vehicles in both the half shafts and propeller shafts of these vehicles.

Figure 6:
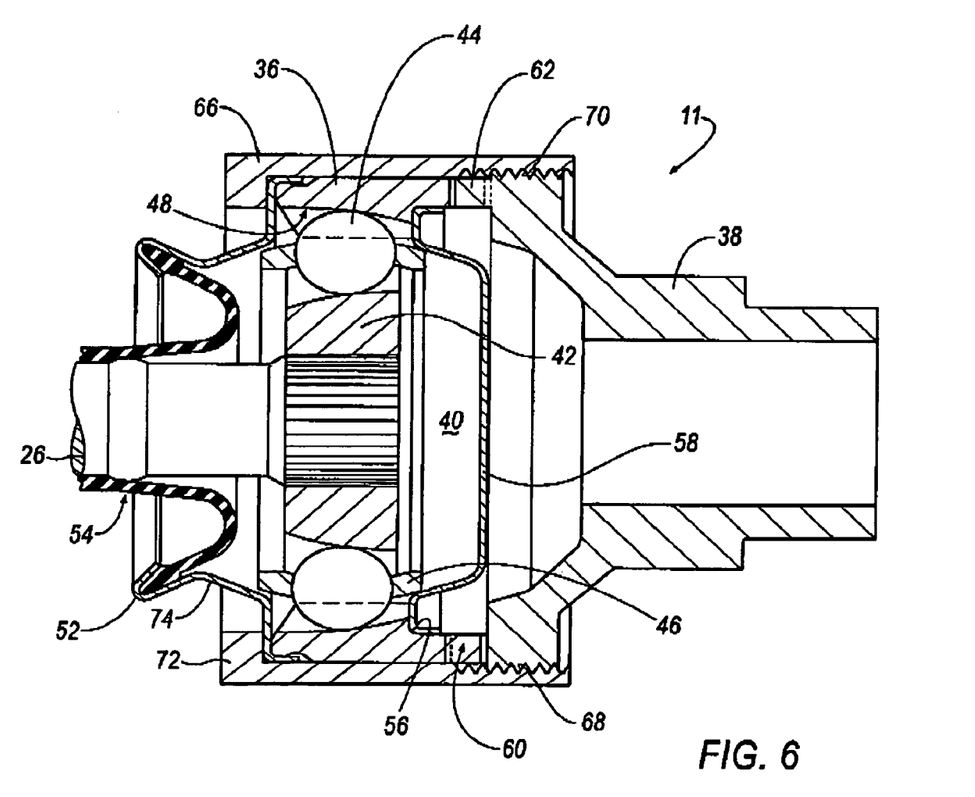
FIG. 6 shows a cross section of a constant velocity joint according to the present invention.

FIG. 6 shows one embodiment of the current invention. The constant velocity joint 11 is a fixed constant velocity joint that is generally used in the propeller shaft 26 in an all wheel drive vehicle. It should be noted that any other type of constant velocity joint may also be used. The constant velocity joint 11 includes an outer race 36 that has a flange 38 in contact with one end thereof. An inner wall of the outer race 36 generally defines a constant velocity joint chamber 40. An inner race 42 is located and arranged within the outer race 36. The inner race 42 is connected to a drive shaft or propeller shaft 26 of the vehicle. A plurality of balls or rolling elements 44 are located between an outer surface of the inner race 42 and the inner wall of the outer race 36. The balls 44 are held in position between the outer race 36 and inner race 42 surfaces by a cage 46. Each race ball 44 is located within an indentation or track 48 of the outer race 36 inner surface. The rotation of the outer race 36 will rotate the inner race 42 at the same or constant speed, thus allowing for constant velocity to flow through the joint 11 in between the propeller shaft 26 and the power takeoff unit or differential that is at an angle up to a predetermined fixed angle. The constant velocity joint 11 will allow the angle to change because the balls 44 will rotate and compensate for any difference in the angle between the shafts by moving within the outer race an inner race tracks or indentations 48.

A ring retainer or any known fastener is located on an inside surface of the inner race 42 to connect the propeller shaft 26 to the inner race 42. Any other type of connection is also possible between the propeller shaft 26 and the inner race 42.

A boat cover 74 is connected to an end of the outer race 36. One end of the boot cover 74 has a channel 52 that runs along the entire periphery of the boot cover 74. A boot member 54, which in the preferred embodiment is made of urethane, however it should be noted that any other type of hard or soft plastic, rubber, composite, fabric, or like material may also be used, is secured within the channel 52 of the boot cover 74 while the other end of the boot 54 engages the propeller shaft 26 and is held in place by a boot clamp. The boot 54 will seal the constant velocity joint 11 from any outside contaminants, such as water, dirt, and road grime. The suppleness of the boot 54 allows for a seal to be maintained to any angle of inclination that the drive shafts or half shafts may encounter during normal roadway and off-road driving operations. An interior surface of the outer race 36 or flange 38 includes a shoulder portion 56. The shoulder portion may include plugs or covers 58 which are generally made of a metal material and seal the outer race 36 and chamber 40 from contaminants.

The constant velocity joint 11 also includes a flange 38 that is secured to one end of the outer race 36 via a face spline 60 located on both an end of the flange 38 and one end of the outer race 36. The face splines 60 generally have the appearance of a plurality of predefined teeth 62 that have specific heights and angled edges to allow for a secure connection between the outer race 36 and the flange 38 while also reducing any noise or vibration that might be caused between a toothed connection in the constant velocity joint 11. The plurality of teeth 62 are located on the face of each of the flange 38 and outer race 36 and are arranged at the outer periphery of both the flange 38 arid outer race 36. The teeth 62 may be a continuous row of teeth 62 around the entire outer periphery or the teeth 62 may include predetermined gaps 64 built into the teeth 62, providing less weight and easier mounting. The teeth 62 on both the flange 38 and outer race .36 in the embodiment shown generally have a square shaped tooth 62, however any other shaped tooth may be used depending on the design requirements of the constant velocity joint 11. Therefore, the teeth 62 on the flange 38 will interchange with the teeth 62 on the outer race 36 and create a rotatably fixed connection between the outer race 36 and the flange 38 which will allow for rotational torque to be transferred through the constant velocity joint 11. Hence, it should be noted that different heights, widths and angles may be used on the teeth 62 of both the flange 38 and the outer race 36 which will allow for specific torque transfer capabilities to be designed into the constant velocity joint 11 according to the present invention.

The flange 38 and outer race 36 of the constant velocity joint 11 according to the present invention are connected and secured in an axial direction via a boltless joint mounted collar 66. The collar 66 generally has the shape of a cylindrical tube. It should be noted that all of the parts discussed above, i.e., the inner race 42, cage 46, race balls 44, outer race 36, flange 38, and collar 66 are generally made of a steel material, however it should be noted that any other type of metal, hard plastic, composite, etc., may also be used for all of the parts for the constant velocity joint 11 according to the present invention.

FIG. 6 shows one embodiment of the boltless axial retention joint mounted collar 66. The constant velocity joint 111 includes a plurality of threads 68 on an outer surface of the flange 38. The collar 66 includes a plurality of threads 70 on an inside surface of the collar 66 on one end thereof. It should be noted that the threads 68, 70 may be a full thread which are arranged around the entire periphery of both the flange 38 and the collar 66. However, it is also contemplated to use an interrupted thread that will have thread arranged in predetermined arches on both the outer surface of the flange 38 and the inner surface of the collar 66. The interrupted thread will allow for easier assembly since the collar can be locked with only a partial rotation of the collar with respect to the flange. The collar 66 also includes a shoulder or flange 72 extending in an inward radial direction on the end opposite of the threads 70.

Figure 9:
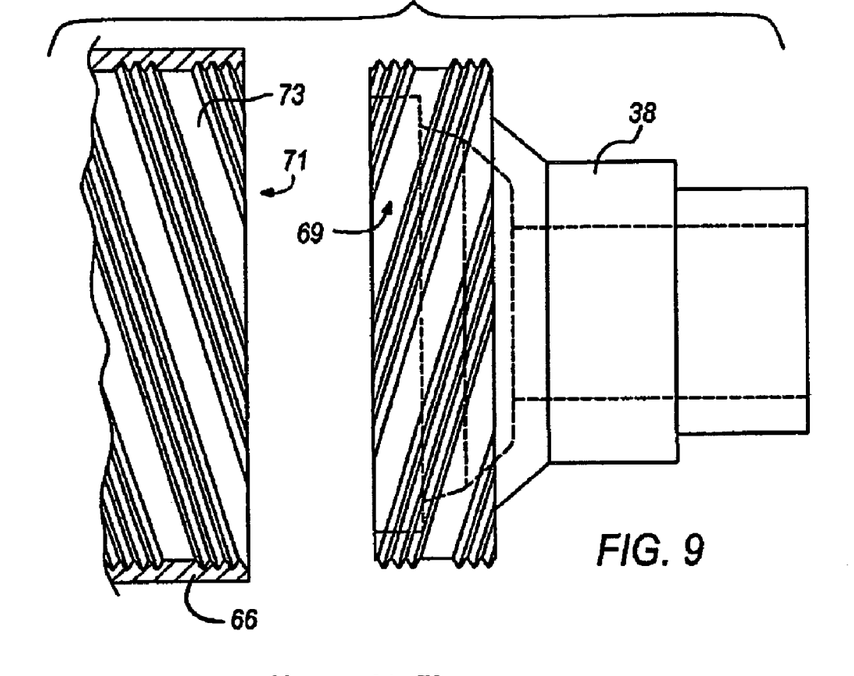
FIG. 9 shows an assembly view of an alternative flange and collar embodiment for the joint of FIG. 6.

FIG. 9 shows an assembly view of the flange 38 with interrupted or partially arranged threads 69, and the collar 66 with corresponding interrupted or partially arranged threads 71. As can be seen, such threads can alternate radially with a smooth portion 73 on the inside surface of the collar 66.

In operation the flange 38 and the outer race 36 are aligned such that the face splines 60 will interengage with one another. Next the collar 66 is arranged over the outer race 36 and the threads 68, 70 are interengaged between the collar 66 and the flange 38, such that the collar 66 is rotated until both the outer race 36 and the flange 38 are secured to one another. When the collar 66 is in its fully closed or secured position the shoulder 72 will contact a boot cover 74 or outer race 36 of the constant velocity joint 11. Hence, the flange 38 will be contacting the outer race 36 and the threads 68 on the flange 38 will be interengaged with the threads 70 on the collar 66 to form a secure axial connection for the constant velocity joint 11. Therefore, the constant velocity joint 11 will be axially retained within the prop shaft environment of the automotive vehicle without the use of bolts to secure the constant velocity joint 11 to the prop shaft 26. The use of the collar 66 will decrease assembly time for the constant velocity joint 11 in the automotive vehicle environment.

Figure 2:
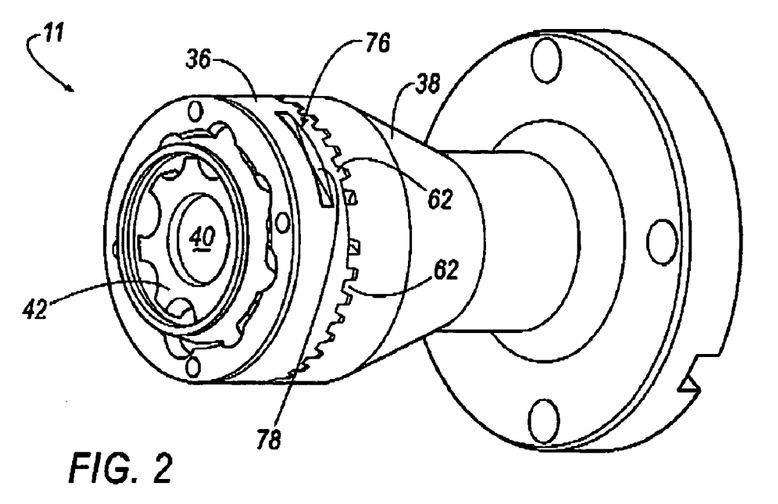
FIG. 2 shows a plan view of a constant velocity joint according to the present invention.
Figure 3:
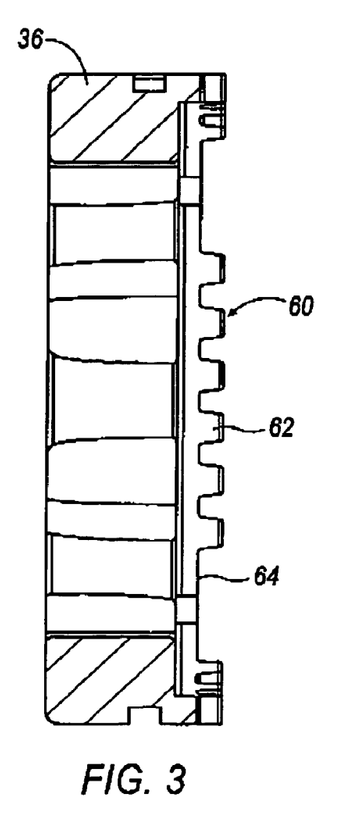
FIG. 3 shows a cross section of an outer race of the constant velocity joint according to the present invention.
Figure 4:
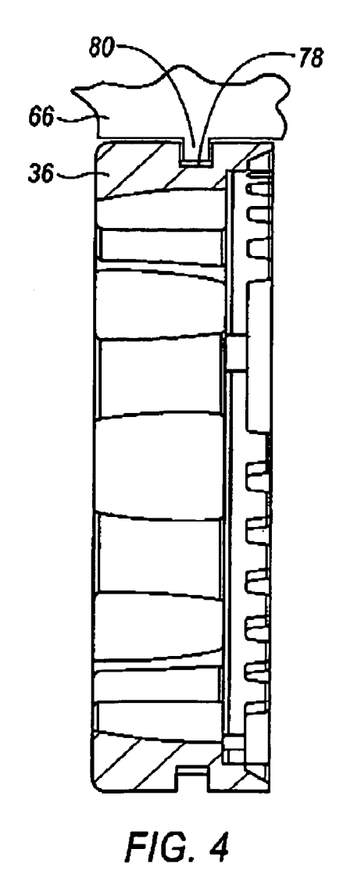
FIG. 4 shows a cross section of the outer race of a constant velocity joint according to the present invention.
Figure 5:
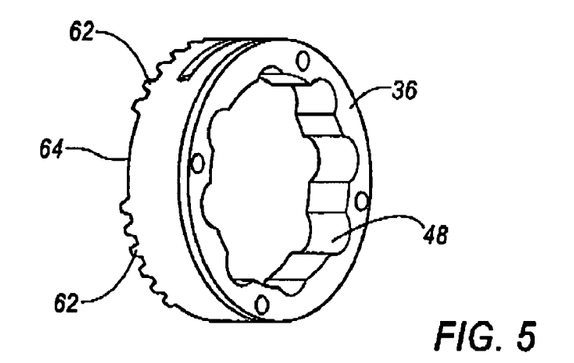
FIG. 5 shows a plan view of an outer race of a constant velocity joint according to the present invention.

It should be noted that it is also contemplated to use a locking lug arrangement 76 to secure the outer race 36 to the flange 38, see FIGS. 2 and 4. The locking lug arrangement 76 will include a plurality of predetermined width and depth channels 78 arranged on the surface of the flange 38 or outer race 36 adjacent to the teeth 68, 70 of the face spline 60 of the flange 38 or outer race 36. The channels 78 will interengage with a plurality of ribs or lugs 80 extending from an inside surface of the collar 66. The collar 66 will be arranged over the outer race 36 and twisted until the rib 80 interengages with the channel 78 thus locking the flange 38 to the outer race 36 in an axial direction. It should be noted that any other amount of radial rotation may be used but in the embodiment contemplated a quarter turn lock lug system is performed.

Figure 10:
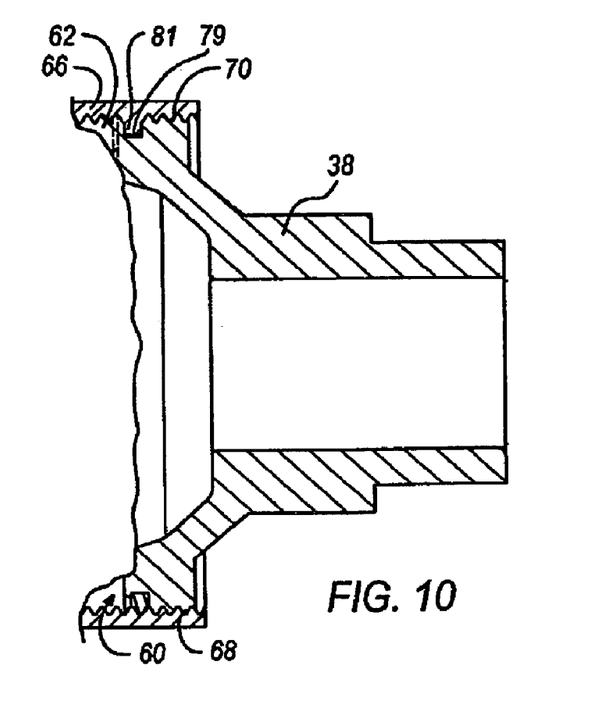
FIG. 10 shows a partial cross section view of a locking lug arrangement according to an embodiment of the present invention.

FIG. 10 shows a partial cross section similar to the locking lug arrangement of FIGS. 2 and 4. Here, however, the locking lug arrangement includes a plurality of predetermined width and depth channels 79 on the surface of the flange 38 such that the channels interengage a plurality of ribs or lugs 81 extending from an inside surface of the collar 66.

Figure 7:
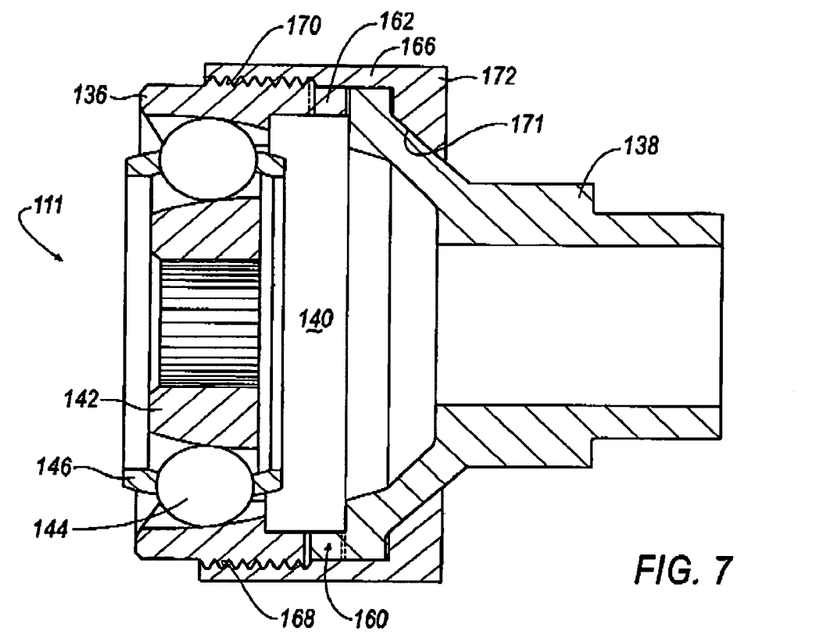
FIG. 7 shows a partial cross section of an alternate embodiment of a constant velocity joint according to the present invention.

FIG. 7 shows an alternate embodiment of a constant velocity joint 11 using a collar 166 to secure the outer race 136 to the flange 138, each having a face spline 160 as discussed above. Like numerals indicate like parts. In FIG. 7, the outer race 136 includes a plurality of full threads or interrupted threads 168 along an outer surface on one end thereof. The collar 166 generally has the shape of a cylindrical tube. The collar 166 includes a plurality of threads or interrupted threads 170 located on the inner surface thereof at one end. The collar 166 also includes a radially inward extending shoulder or flange 172. The radially inward extending shoulder 172 on the collar 166 includes a tapered surface 171 which will match an outer tapered surface of the flange 138. In operation, the flange 138 will be aligned with the outer race 136 such that the teeth 168, 170 of the face splines 160 of both the flange 138 and the outer race 136 interengage with one another. After the flange 138 and outer race 136 are properly aligned with one another, the collar 136 is arranged over the flange 138 and interengages and connects via the full threads or interrupted threads 168, 170 to the outer race 136. When the collar 166 is placed in its fully closed or secured position, the tapered surface 171 will interengage with the tapered surface of the flange 138 and secure the flange 138 to the outer race 136 in an axial direction. Therefore, the collar 166 is rotated until the tapered shoulder 172 of the collar 166 engages with the angled surface of the flange 138. The interrupted threads may be used as described above to create a quarter turn, half turn, etc., assembly for the constant velocity joint 111.

The embodiment of FIG. 7 may also include a locking lug arrangement similar to that described above for FIG. 4. The locking lug arrangement will include a plurality of channels located on an outer surface of the constant velocity joint outer race 136. The collar 166 would then include a plurality of ribs or lugs which will interact with the channels to form a secure axial connection for the constant velocity joint 111. With the flange 138 axially secured to the outer race 136 the constant velocity rotational torque may then be passed through the constant velocity joint 111 without the need for bolts to retain the constant velocity joint 111 in axial position relative to the prop shaft and other drive line components. It should be noted that the lug extending from the inner surface of the collar 166 in one contemplated embodiment may be spring loaded such that when it is placed over the outer race 136 the lugs will interact with the channels on the outer surface of the outer race 136 via a force directed in an inner radial direction to secure the lug within the channel thus axially securing the flange 138 to the outer race 136.

Figure 8:
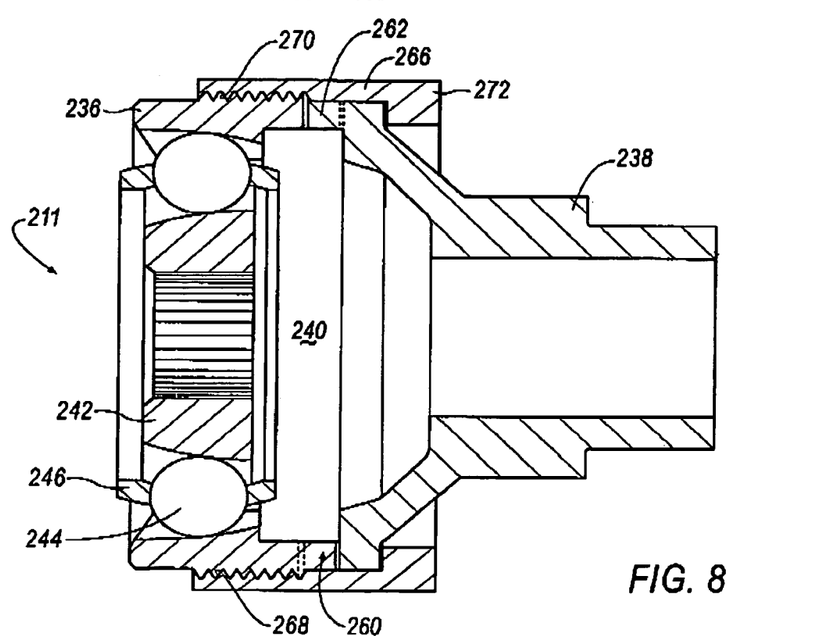
FIG. 8 shows a partial cross section of an alternate embodiment of a constant velocity joint according to the present invention.

FIG. 8 shows yet another alternate embodiment of a constant velocity joint 211 according to the present invention which will axially retain the flange 238 to the outer race 236 without the use of bolts. Like numerals indicate like parts. In this embodiment, a plurality of full threads or interrupted threads 268 are arranged on an outer surface of the outer race 236. The collar 266 has a cylindrical tube shape. The collar 266 also includes a plurality of full threads 270 or interrupted threads on an inside surface at one end thereof. The collar 266 also includes an axially extending shoulder or flange 272 at the opposite end thereof. During operation the flange 238 will be aligned and interengaged with the outer race 236. The face spline 260 of both the flange 238 and outer race 236 will interengage with one another to create a fixed rotational relationship between the flange 238 and outer race 236. The collar 266 will be arranged over the flange 238 and then rotated until the shoulder 272 of the collar 266 engages with the flange 238 of the constant velocity joint 211. With the shoulder 272 engaged against the flange 238 of the constant velocity joint 211, the outer race 236 and flange 238 of the constant velocity joint 211 will be axially retained with respect to one another. The collar 266 may have interrupted threads and will be arranged such that only a quarter turn, half turn or three quarter turn, etc., is needed once the collar 266 is placed over the flange 238 and outer race 236. When using interrupted threads, a smooth portion of the collar 266 would be aligned with a threaded portion of the outer race 236 and the collar 266 would be moved until the shoulder 272 engages with the flange 238 of the constant velocity joint 211, then the collar 266 would be rotated in a clockwise or counterclockwise direction until the threads 268, 270 engage thus locking the flange 238 to the outer race 236 via the collar 266.

It should also be noted that a locking lug arrangement may be used as discussed above for FIGS. 2 and 4 for the present embodiment. The collar 266 would include a plurality of lugs extending from an inner surface near an end of the collar. These lugs would be forced in a radially inward direction when the collar 266 aligns properly with the channels on the outer race 236 thus creating a secure axial connection for the constant velocity joint flange 238 and the outer race 236. This also would allow for rotational torque to be passed through the constant velocity joint 211 to the prop shaft and axle modules to be used. The axial retention for all embodiments is done without the use of bolts which will reduce the weight, cost and complexity of installation of the constant velocity joint using any of the three axial retention methods described.

Therefore, all of the above identified embodiments of the boltless axial retention collar 66 will allow for a constant velocity joint 11 to be secured and assembled into the vehicle driveline without the use of bolts. The rotational torque will be passed through the prop shaft 26 and the constant velocity joints 11 via the use of a face spline 60 between the flange 38 and outer race 36 of the constant velocity joint 11. A collar 66 will be used to connect the flange 38 to the outer race 36 and retain them with respect to one another in an axial direction. Thus, the constant velocity joint 11 will be axially secured in the driveline, but will use a face spline 60 to transmit torque through the constant velocity joint 11 and onto the axle module or wheels in the automotive vehicle. The use of the collar 66 will reduce weight, decrease complexity of installation and allow for a variety of methods and variations of constant velocity joints to be used at different areas of the vehicle driveline.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A joint assembly for use in a vehicle, said assembly including:
   an outer race having an outer ball track;
   an inner race arranged in said outer race;
   a rolling element arranged between said outer race and said inner race and within said outer ball track;
   a cage arranged between said inner race and said outer race, said cage having a window for positioning said rolling element;
   a flange contacting said outer race;
   at least one of a boot or cover sealing an interior chamber of the joint assembly; and
   a collar contacting said flange and said outer race, said collar having a plurality of threads on an inside surface thereof adapted to engage a threaded outer surface of said outer race or flange.

2. The assembly of claim 1 wherein said flange includes a face spline.

3. The assembly of claim 2 wherein said outer race includes a face spline on one end thereof.

4. The assembly of claim 3 wherein said outer race face spline and said flange face spline interact and rotatably fix said outer race to said flange.

5. The assembly of claim 3 wherein said collar includes a shoulder portion at an end thereof.

6. The assembly of claim 5 wherein said shoulder has a predetermined taper extending from an end thereof.

7. The assembly of claim 5 wherein said shoulder portion contacts said flange or a boot cover of said outer race.

8. The assembly of claim 1 wherein said plurality of threads are interrupted or partially arranged on said inside surface thereof.

9. The assembly of claim 8 wherein said threads alternate radially with a smooth portion on said inside surface.

10. The assembly of claim 8 wherein said outer race has a plurality of interrupted of partial threads on an outside surface thereof.

11. The assembly of claim 8 wherein said flange includes a plurality of interrupted or partial threads on an outside surface thereof.

12. The assembly of claim 1 wherein said outer race and said collar having a locking lug arranged therebetween.

13. The assembly of claim 1 wherein said flange and said collar have a looking lug arranged therebetween.

14. The assembly of claim 1 wherein said outer race has a plurality of threads on an outer surface thereof, said plurality of threads of said collar and said outer race interengage with each other to secure said outer race to said flange.

15. A boltless constant velocity joint for use in a vehicle, said joint including:
   an outer race;
   an inner race arranged with said outer race;
   a rolling element arranged between said outer race and said inner race;
   a cage arranged around said rolling element;
   a boot cover connected to one end of said outer race;
   a boot in contact with said boot cover;
   a flange contacting said outer race; and
   a collar having a radially inward extending shoulder, said collar contacting said flange and said outer race and having a plurality of threads on an inside surface thereof adapted to engage a threaded outer surface of said outer race or flange.

16. The joint of claim 15 wherein said plurality of threads are interrupted or partially arranged on said inside surface thereof.

17. The joint of claim 15 wherein said flange or outer race includes a plurality of full or interrupted threads on an outer surface thereof.

18. The joint of claim 15 wherein said collar and said outer race has a locking lug arrangement therebetween.

19. The joint of claim 15 wherein said collar and said flange include a locking lug arrangement therebetween.

* * * * *